United States Patent [19]

Hirose

[11] Patent Number: 5,588,149

[45] Date of Patent: Dec. 24, 1996

[54] DOCUMENT CLASSIFICATION AND RETRIEVAL WITH TITLE-BASED ON-THE-FLY CLASS MERGE

[75] Inventor: Kenji Hirose, Yokohama, Japan

[73] Assignee: Kabushiki Kaisha Toshiba, Kawasaki, Japan

[21] Appl. No.: 306,947

[22] Filed: Sep. 16, 1994

[30] Foreign Application Priority Data

Sep. 21, 1993 [JP] Japan .................................. 5-234979

[51] Int. Cl.⁶ .................................................. G06F 17/30
[52] U.S. Cl. .................................................. 395/601
[58] Field of Search ........................ 395/600; 364/419.19

[56] References Cited

U.S. PATENT DOCUMENTS 5,162,992  11/1992  Williams .................................. 395/600

FOREIGN PATENT DOCUMENTS 3142678  6/1991  Japan .

Primary Examiner—Thomas G. Black
Assistant Examiner—Paul R. Lintz
Attorney, Agent, or Firm—Cushman, Darby & Cushman, IP Group of Pillsbury Madison & Sutro LLP

[57] ABSTRACT

In an image processing apparatus, classifications in an alias table can be integrated, at the same time, a new classification name can be defined and a title can be automatically corrected. With this apparatus, after similar classifications of an alias table have been registered, the classifications can be corrected, with the result that the confusion of classifications is prevented, an image can be accurately retrieved in the future and titles can be automatically corrected when aliases are integrated.

2 Claims, 8 Drawing Sheets

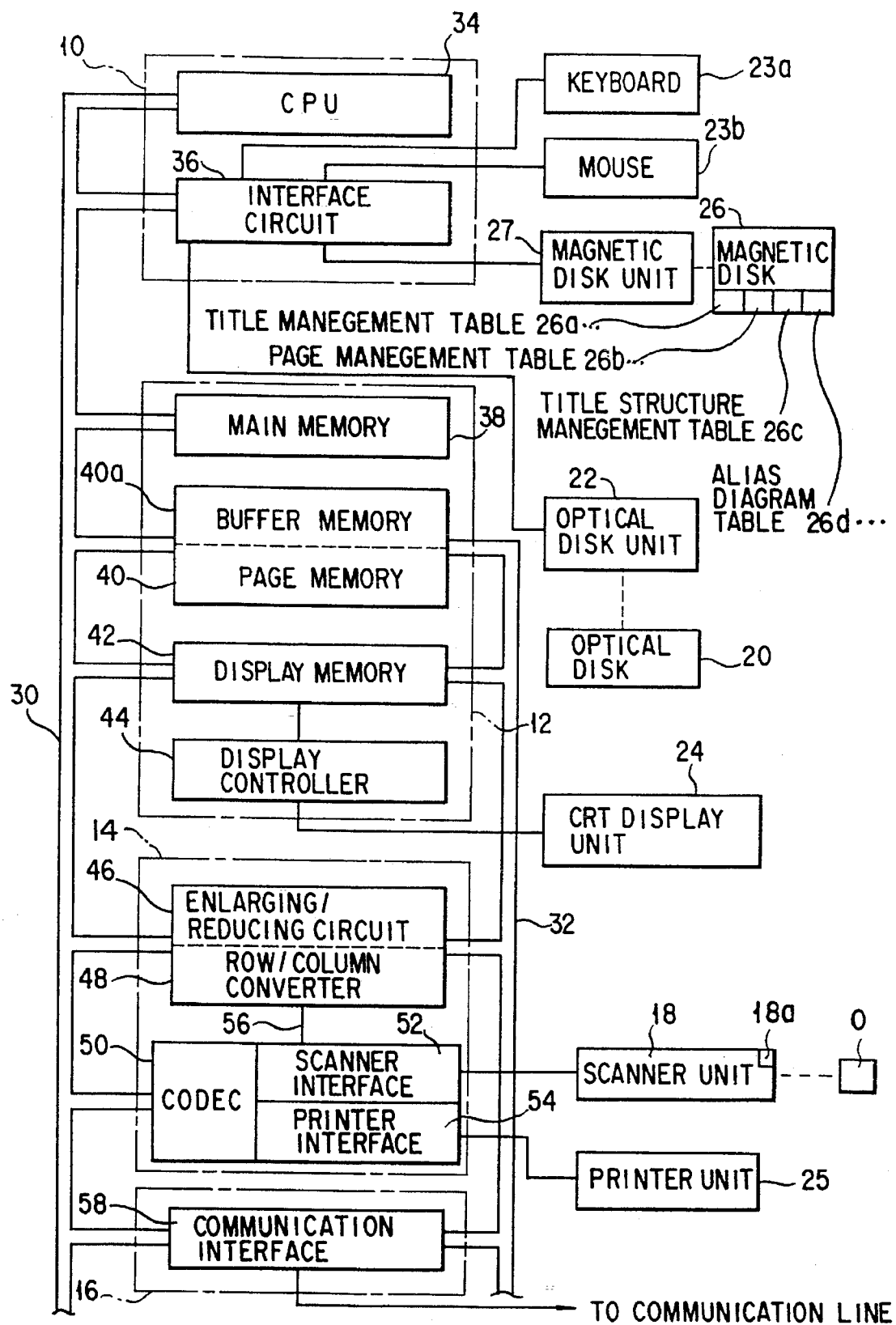
F I G. 1

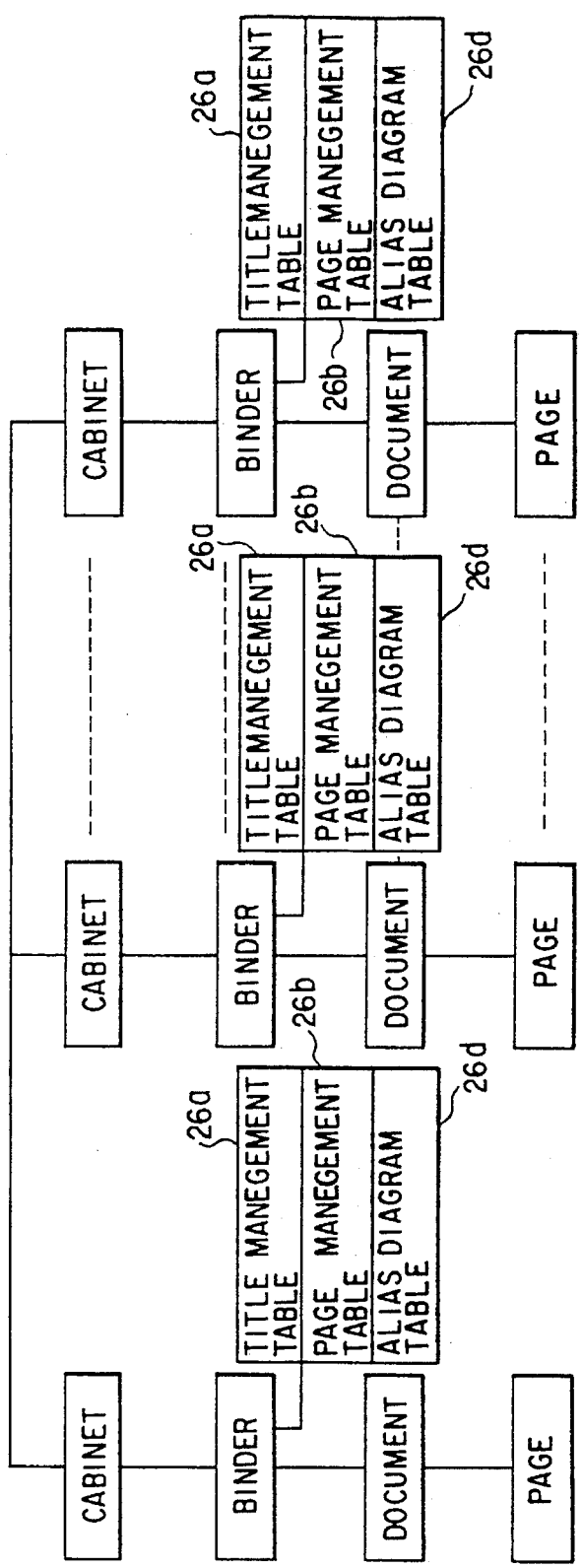

| TITLE NO. | PAGE NO. | RECORD NO. | RECORD ADDRESS | DOCUMENT SIZE |
|---|---|---|---|---|
| 1 | 1 | 1 | 0 | A4 |
| 1 | 2 | 2 | 100 | A5 |
| 2 | 1 | 3 | 150 | B4 |
| | | | | |

26b

F I G. 4

| BINDER NO. | KEY NO. | KEY ATTRIBUTE | LENGTH | KEY NAME |
|---|---|---|---|---|
| 1 | 1 | | | CLASSIFICATION 1 |
| 1 | 2 | | | CLASSIFICATION 2 |
| 1 | 3 | | | CLASSIFICATION 3 |
| 1 | 4 | | | TITLE |
| 1 | 5 | | | RECODING DAY |
| | | | | |

26a

F I G. 5

| NO | CONTENTS |
|---|---|
| 1 | A TECHNICAL OFFICIAL PRESENT MATERIALS |
| 2 | A PLAN TECNICAL METHOD |
| 3 | A WEEKLY PAPER |
| 4 | AN OPERATION EXPLANATORY NOTE |
| 5 | CONSTRUCTION / ORGANIZATION |
| 6 | ---------- |
| 7 | ---------- |
| 8 | ---------- |
| 9 | A REPORT |
| 10 | AUTHORIZATION MATERIALS |
| 11 | SOFTWARE QC MATERIALS |
| 12 | EMPHASIS SUBJECT |
| 13 | ---------- |
| 14 | PLAN REVIEW MATERIALS |
| 15 | A TECHNICAL MATERIALS |
| 16 | A STANDARD / REGULATIONS |
| 17 | MODEL 2 |
| 18 | SPECIFICATIONS |
| 19 | ---------- |
| 20 | THE MINUTES |
| 21 | ---------- |
| 22 | ---------- |
| 23 | ---------- |
| 24 | ---------- |
| 25 | QUALITY MATERIALS |

~26d (at row 9)

| NO | CONTENTS |
|---|---|
| 1 | A TECHNICAL OFFICIAL PRESENT MATERIALS |
| 2 | GENERAL TECHNICAL MATERIAL |
| 3 | A WEEKLY PAPER |
| 4 | AN OPERATION EXPLANATORY NOTE |
| 5 | CONSTRUCTION / ORGANIZATION |
| 6 | ---------- |
| 7 | ---------- |
| 8 | ---------- |
| 9 | A REPORT |
| 10 | AUTHORIZATION MATERIALS |
| 11 | SOFTWARE QC MATERIALS |
| 12 | EMPHASIS SUBJECT |
| 13 | ---------- |
| 14 | |
| 15 | |
| 16 | A STANDARD / REGULATIONS |
| 17 | MODEL 2 |
| 18 | SPECIFICATIONS |
| 19 | ---------- |
| 20 | THE MINUTES |
| 21 | ---------- |
| 22 | ---------- |
| 23 | ---------- |
| 24 | ---------- |
| 25 | QUALITY MATERIALS |

FIG. 9

| TITLE NO. | KEY1 CLASSIFI-CATION 1 | KEY2 CLASSIFI-CATION 2 | KEY3 CLASSIFI-CATION 3 | KEY4 TITLE | KEY5 RECODING DAY |
|---|---|---|---|---|---|
| 1 | 2 | 99 | 99 | PLAN··· | 921130 |
| 2 | 4 | 88 | 88 | OPERATION·· | 921201 |
| 3 | 2 | 77 | 77 | PLAN··· | 921202 |
| 4 | 2 | 66 | 66 | TECHNICAL·· | 921203 |
| | | 26a | | | |

F I G. 10

DOCUMENT CLASSIFICATION AND RETRIEVAL WITH TITLE-BASED ON-THE-FLY CLASS MERGE

BACKGROUND OF THE INVENTION

1. Field of the Invention

The present invention relates to a data processing system, such as an image filing apparatus, for recording and retrieving an image.

2. Description of the Related Art

In recent years, image filing apparatuses have become practical. The image filing apparatus reads images from a number of documents by means of a scanner (two-dimensional scanning apparatus), records the images on an optical disk, retrieves and reads out a desired image from the recorded images, and outputs the read image in an output device, such as a CRT display device or a recording device, so that the read image is visible.

In this type of apparatus, a retrieval key as for retrieving an image is input through a keyboard.

Registration of documents in various classifications is supported by use of an alias table in order to save the time that it would take to input the name of a classification every time a document is registered. That is, a classification number, instead of classification name, is input in a registration or retrieve operation.

When documents are to be registered, classifications are first determined and an alias table is created in accordance with the classifications. In general, all the classifications are not determined before the registration, and some classifications are added during the registration. However, as classifications are added one after another, there is the drawback that similar classifications may be created and confusion in classification may occur, in which case, the classifications become indefinite with the result that an image cannot be retrieved accurately in the future.

At present, when a new classification is to be added, the entire alias table is displayed on a CRT display device and a classification is added or corrected while the registered classifications are being viewed. Even in this case, similar classifications are registered.

Further, if the alias table is changed, it is necessary to retrieve titles having alias numbers integrated therein and to correct these titles one by one. It is, therefore, practically impossible to change the classification.

As described above, the conventional apparatus has the drawback that similar classifications may be created and confusion in classification may occur, in which case, the classifications become indefinite and an image cannot be retrieved accurately in the future.

SUMMARY OF THE INVENTION

An object of the present invention is to provide an image recording apparatus and an image recording/retrieving apparatus, in which, after similar classifications of an alias table have been registered, the classifications can be corrected, with the result that the confusion of classifications is prevented, an image can be accurately retrieved in the future and titles can be automatically corrected when aliases are integrated.

To achieve the above object, the present invention provides a data processing system, comprising: first recording means for recording a plurality of data; second recording means for recording retrieval titles used for retrieving data recorded in the first recording means; third recording means for recording a correspondence table in which a plurality of different symbols respectively correspond to a plurality of series of letters; retrieval title producing means for producing the retrieval titles to be recorded in the third recording means by designating a symbol in the correspondence table recorded in the second recording means, and recording a series of letters corresponding to the symbol as a retrieval title, together with the designated symbol; first designating means for designating a plurality of series of letters recorded in the correspondence table in the third recording means in order to integrate the designated series of letters into one series of letters; second designating means for designating a new series of letters for the plurality of series of letters designated by the first designating means; third designating means for designating a symbol corresponding to the new series of letters designated by the second designating means; first processing means for deleting the plurality of series of letters designated by the first designating means from the correspondence table in the third recording means and for recording in the correspondence table the new series of letters in correspondence with the symbol designated by the third designating means; and second processing means for extracting a symbol corresponding to the series of letters to be integrated, designated by the first designating means, from the retrieval titles recorded in the second recording means, and changing the extracted symbol to the symbol designated by the third designating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram schematically showing an electronic filing apparatus according to an embodiment of the present invention;

FIG. 2 is a diagram for explaining a document managing system of the electronic filing apparatus;

FIGS. 3 and 10 are diagrams for explaining an example of a title managing table recorded on a magnetic disk;

FIG. 4 is a diagram for explaining an example of a page managing table recorded on a magnetic disk;

FIG. 5 is a diagram for explaining an example of a title structure managing table recorded on a magnetic disk;

FIGS. 6 and 9 are diagrams for explaining an example of an alias table recorded on a magnetic disk;

FIG. 7 is a diagram showing an example of a display of a CRT display device.

DETAILED DESCRIPTION OF THE PREFERRED EMBODIMENT

Figure 8:
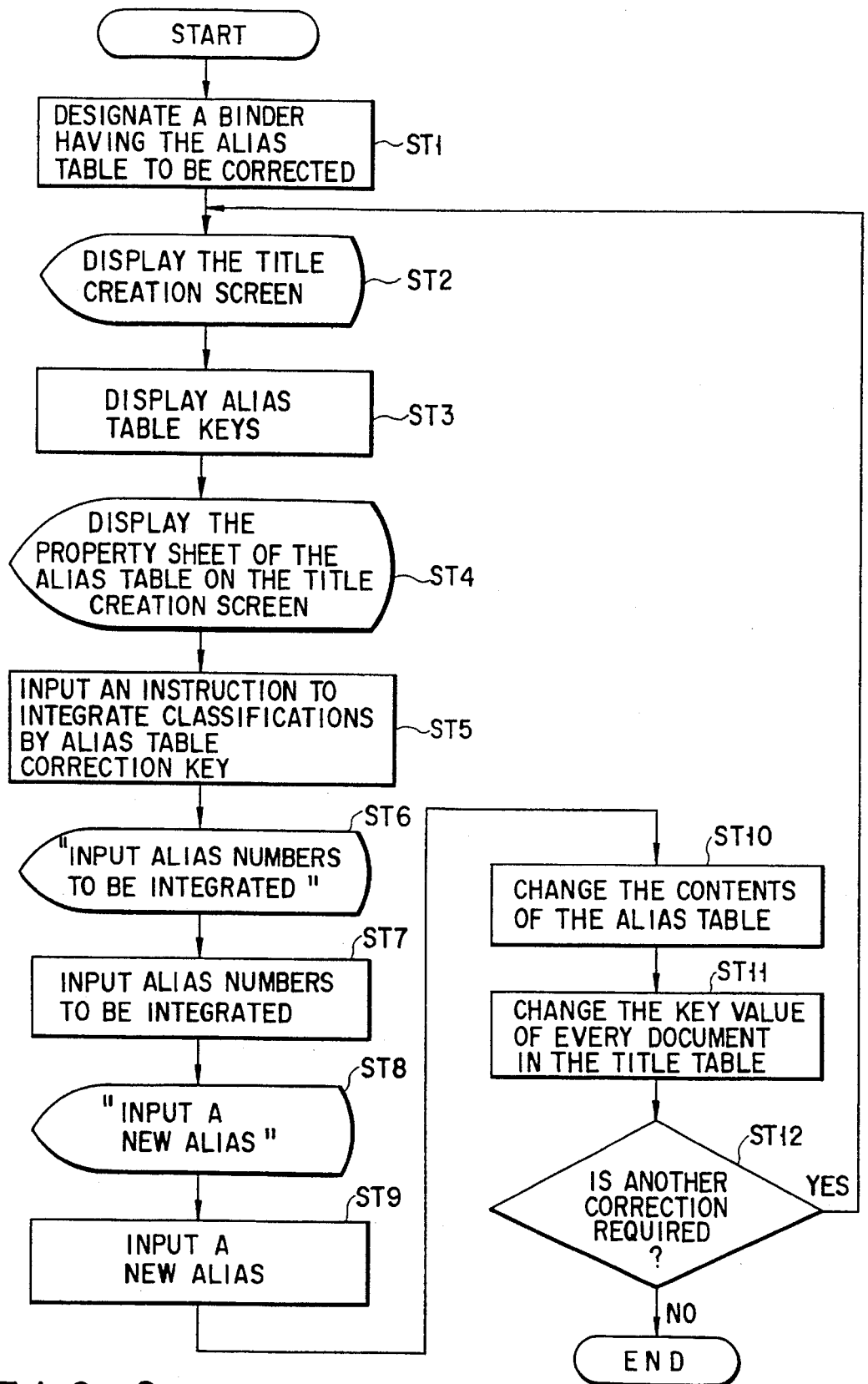
FIG. 8 is a flowchart for explaining a process operation for correcting an alias table.

An embodiment of the present invention will be described with reference to the accompanying drawings.

FIG. 1 shows an example of the structure of an image recording apparatus or image recording/retrieving apparatus of the present invention, for example, an electronic filing apparatus. The electronic filing apparatus comprises a control module 10, a memory module 12, an image processing module 14, a communication control module 16, a scanner 18, an optical disk (first recording means) 20, an optical disk apparatus 22, a keyboard 23a, a mouse 23b, a CRT display 24, a printer 25, a magnetic disk 26, a magnetic disk apparatus 27, a system bus 30 and an image bus 32.

The control module 10 comprises a CPU 34 for performing various control operations for recording, retrieving and editing an image and an interface circuit 36 for connecting the CPU 34 with the optical disk apparatus 22, the keyboard 23a, the mouse 23b and the magnetic disk apparatus 27.

The memory module 12 comprises a main memory 38 for storing various control programs and management data for recording, retrieving and editing an image, a page memory 40 serving as an image memory of a record capacity corresponding to images on several pages of A4-size documents, a display memory 42 serving as a display interface, a display control section 44, and so on. A buffer memory area 40a is formed in part of the page memory 40. The page memory 40 temporarily stores, for example, an image which is to be recorded in or which has been read out from the optical disk 20.

The display memory 42 temporarily stores an image to be displayed on the CRT display 24. More specifically, it stores an image to be actually displayed in a display window of the CRT display device 24, e.g., an image obtained by enlarging, reducing rotating, or write-black inverting an image read from the page memory 40 or an image read from the buffer memory 40a, or inserting another image into the read image.

The image processing module 14 comprises: an enlarging and reducing circuit 46 for enlarging and reducing an image; a longitudinal-lateral converting circuit 48 for rotating an image; a compressing and expanding (CODEC) circuit 50 for performing an encoding process for compressing an image (reducing a redundancy) and a decoding process for expanding an image (recovering the reduced redundancy); a scanner interface 52 for the scanner 18; a printer interface 54 for the printer 25; and an internal bus 56 for connecting the enlarging and reducing circuit 46 and the longitudinal-lateral converting circuit 48 with the compressing and expanding circuit 50, the scanner interface 52 and the printer interface 54.

The compressing and expanding circuit 50 performs a band compression or band expansion by means of the MH (Modified Huffman) method or the MR (Modified Read) method.

The communication control module 16 comprises a communication interface 58, such as a BCP (Bus Communication Processor), connected to a LAN, for example. The communication control module 16 may comprise a UCP (Universal Communication Processor) connected to an external device, such as a FCP (Facsimile Communication Processor) or a personal computer, via an interface.

The system bus 30, through which control signals for various devices are transmitted, connects the control module 10 with the memory module 12, the image processing module 14 and the communication control module 16.

The scanner 18 is a two-dimensional scanning device having, for example, a document feeder 18a. It two-dimensionally scans originals (documents) O, successively supplied from the document feeder 18a, by means of laser beams, thereby obtaining an electric image (image data) corresponding to an image on a document O.

The optical disk apparatus 22 successively records images, read from the originals O by the scanner 18, on the optical disk 20. It also retrieves an image, designated by the keyboard 23, from the optical disk 20.

The keyboard 23a is for inputting a retrieval code, specifically corresponding to an image to be recorded on the optical disk 20, and various operation commands, such as record, retrieve and edit. The mouse 23b is for moving a cursor (not shown) in a desired direction in the display window of the CRT display 24, so that a command can be supplied to the control module at a desired position, thereby selecting or designating the content of display (various operation modes, titles, regions for image edition, and icons) at which the cursor is positioned.

The CRT display (cathode ray tube display) 24 displays an image read by the scanner 18 and an image retrieved from the optical disk 20. Icons are displayed on upper, lower and right end portions of the display window of the CRT display 24.

The printer 25 prints out (hard-copies) an image read by the scanner 18, an image retrieved by the optical disk 20, or an image displayed on the CRT display 24.

The magnetic disk apparatus 27 records various control programs on the magnetic disk 26 inserted in the magnetic disk apparatus 27. It also records retrieval data (retrieval information) including a retrieval code input through the keyboard 23a, a record address of the optical disk 20, in which the image corresponding to the retrieval code is recorded, an image size and the like. It further records management data of a binder to be described later.

A document managing system of this embodiment has four hierarchies of a cabinet, a binder, a document and a page, as shown in FIG. 2. The cabinet is allocated to one side of the optical disk 20. At most 8 binders can be defined in the cabinet. A binder can store at most 30,000 documents which respectively have titles. The structures of the documents are determined in units of binder. The document is a basic file unit, to which a title and a note (a description of the document) can be added. The document is constituted by 4095 pages or less.

Each binder is provided with a title management table (title table, second recording means) 26a and a page management table (page table) 26b. In the title management table 26a, as shown in FIG. 3, a retrieval code (image name) consisting of a plurality of retrieval keys is recorded so as to correspond to one document number, i.e., a title number. An alias number, selected from a alias table (third recording means) 26d can also be used as a retrieval key. In the page management table 26b, a record number is recorded for every page of a document. As shown in FIG. 4, a title number, a page number, a record number, a record address (record start position) in the optical disk 20 of the original image of the record number and a document size (image size) are recorded. The record address is a logic address, from which a physical track address and a physical sector address are calculated, when the disk is accessed.

The magnetic disk 26 includes a title structure management table 26c for managing the structures of titles used in the title management tables 26a and the alias table 26d for recording a table of aliases of the keys of the binder. It is possible that individual alias tables corresponding to a plurality of keys be prepared in a binder.

As shown in FIG. 5, the title structure management table 26c is constituted by a binder number, a key number, a key attribute, a key length indicating the number of digits of the key, and a key name. The key attributes "0", "1" and "2"

respectively indicate a numeral, a character and a Chinese character.

FIG. 6 shows an example of the alias table of the key 1 for a binder recorded in the alias table 26d.

Figure 7:
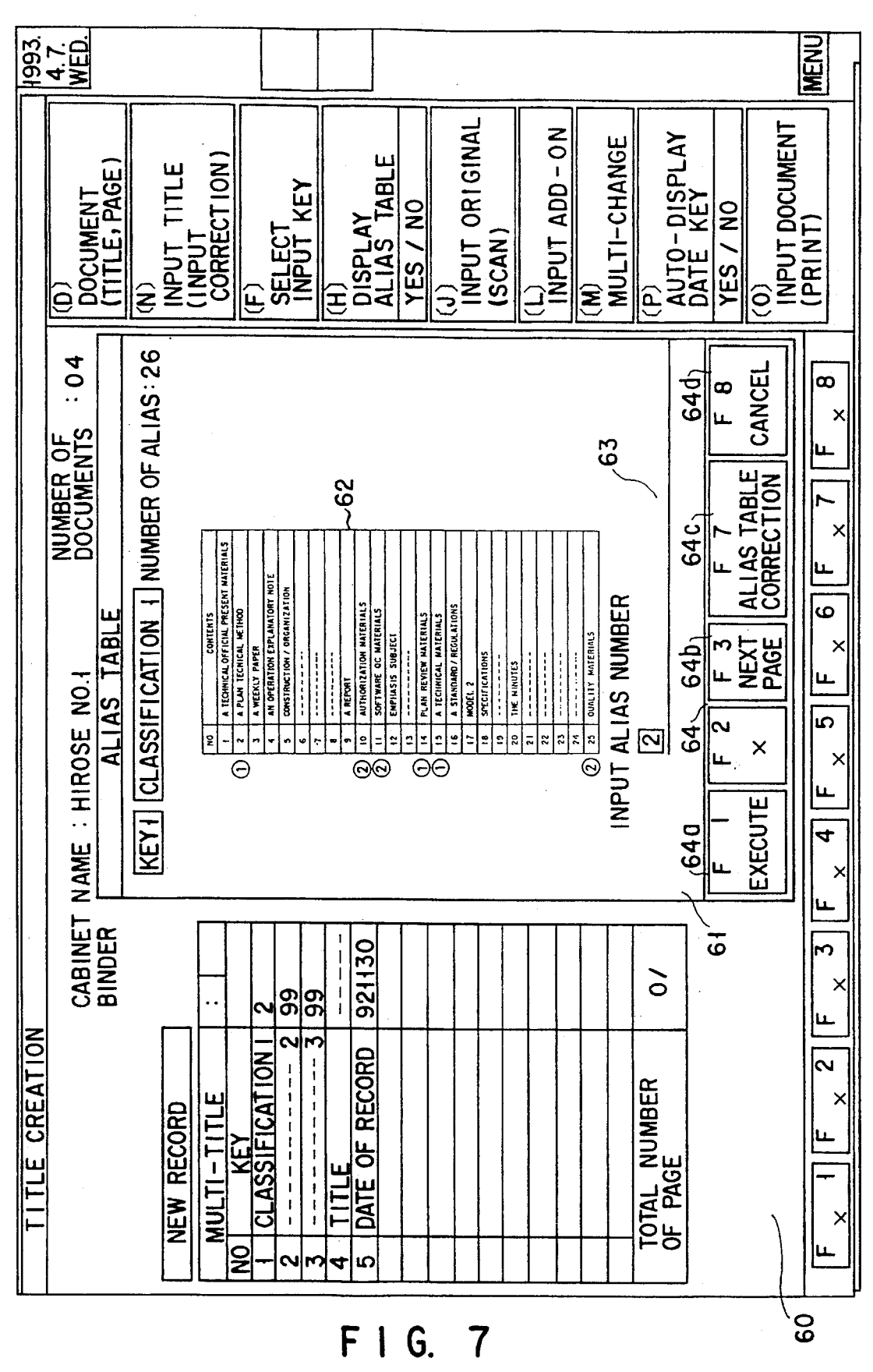

FIG. 7 shows an image displayed on the CRT display 24, when a title is being created, for example, in a state where a property sheet 61 of the alias table 26d is open on a title creation screen 60.

The property sheet 61 includes an alias table section 62, a guide display section 63 and an icon section 64 indicating functions. The alias table section 62 shows, for example, the content of the alias table 26d shown in FIG. 6. The guide display section 63 is for guiding input of an alias number, aliases to be integrated, or a new alias. The icon section 64 includes an execution key 64a, a next page key 64b, an alias table correction key 64c and a cancel key 64d.

An operation of correcting an alias table 26d with the above structure will now be described with reference to the flowchart shown in FIG. 8.

First, a binder, having the alias table 26d to be corrected, is designated (ST1). In accordance with the designation, the CPU opens the corresponding binder and displays the title creation screen 60 on the CRT display 24 (ST2). An alias table key, one of the function keys of the title creation screen 60, is designated (ST3). Accordingly, the CPU 34 reads the alias table corresponding to the binder from the alias table 26d of the magnetic disk 26. The property sheet 61 of the read out alias table is displayed on the title creation plane 60 of the CRT display 24, as shown in FIG. 6 (ST4).

Then, when the alias table correction key 64c is input (ST5), the CPU 34 causes a guidance "input alias numbers to be integrated" to be displayed on the guide display section 63 (ST6). In accordance with this guidance, the alias numbers "2, 14, 15", to be integrated, are selected or input by means of the mouse 23b or the keyboard 23a (ST7). In this case, the number which is input first, or the smallest number, becomes a new integrated alias number. Thereafter, the CPU causes a guidance "input a new alias" to be displayed on the guide display section 63 (ST8). In accordance with this guidance, a new alias "general technical material" is input through the keyboard 23a (ST9).

Subsequently, the CPU 34 changes the contents of the alias table of the alias table 26d, corresponding to the binder, in accordance with the input matters as mentioned above (ST10). In other words, the content corresponding to the alias number "2" is changed to "general technical material" and the contents corresponding to the alias numbers "14, 15" are deleted, as shown in FIG. 9.

Further, the CPU 34 changes the key value of every document of the binder in the title management table 26 (ST11). That is, the key values "14" and "15" as shown in FIG. 3 are successively changed to "2" as shown in FIG. 10.

It is, thereafter, judged whether another correction is required (ST12). If another correction is required, the operation will return to the step ST2. If not, the operation will end.

As described above, classifications in the alias table 26d can be integrated into one, a new classification name can be defined at the same time, and the title can be automatically corrected at the integration of the classifications.

As a result, even after similar classifications of an alias table have been registered, the classifications can be corrected, with the result that the confusion of classifications is prevented, an image can be accurately retrieved in the future and titles can be automatically corrected when aliases are integrated.

In the above embodiment, the data base in which the retrieve data are stored is a magnetic disk 26. However, an area other than the area where an image is recorded on the optical disk can be used as the data base on which the retrieve data is recorded.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing system, comprising:

first recording means for recording a plurality of data;

second recording means for recording retrieval titles including a plurality of retrieving keys used for retrieving data recorded in the first recording means;

third recording means for recording a correspondence table in which a plurality of different symbols respectively correspond to a plurality of series of letters respectively used as retrieving keys;

retrieval title producing means for producing the retrieval titles to be recorded in the second recording means by designating a symbol in the correspondence table recorded in the third recording means, and recording the designated symbol as a retrieving key;

first designating means for designating a plurality of series of letters recorded in the correspondence table in the third recording means in order to integrate the designated series of letters into one series of letters;

second designating means for designating a new series of letters for the plurality of series of letters designated by the first designating means;

third designating means for designating a symbol corresponding to the new series of letters designated by the second designating means;

first processing means for deleting the plurality of series of letters designated by the first designating means from the correspondence table in the third recording means and for recording in the correspondence table the new series of letters in correspondence with the symbol designated by the third designating means; and second processing means for extracting a symbol corresponding to the series of letters to be integrated, designated by the first designating means, from the retrieval titles recorded in the second recording means, and changing the extracted symbol to the symbol designated by the third designating means.

2. The data processing system according to claim 1, wherein the second processing means includes:

extracting means for extracting a symbol corresponding to the series of letters to be integrated, designated by the first designating means, from the retrieval titles recorded in the second recording means, and changing means for changing the symbol extracted by the extracting means to the symbol designated by the third designating means.

\* \* \* \* \*